(12) United States Patent
Steeby et al.

(10) Patent No.: US 6,227,067 B1
(45) Date of Patent: May 8, 2001

(54) INDEPENDENT MOTOR CONTROL FOR X-Y SHIFTER

(75) Inventors: Jon A. Steeby, Schoolcraft; Kurt H. Oliver, Kalamazoo, both of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/429,658

(22) Filed: Oct. 29, 1999

(51) Int. Cl.$^7$ ................................................ B60K 17/04
(52) U.S. Cl. ............................. 74/473.12; 74/473.32
(58) Field of Search .......................... 74/335, 473.12, 74/473.32

(56) References Cited

U.S. PATENT DOCUMENTS

| | | | |
|---|---|---|---|
| 4,621,328 | 11/1986 | Arai et al. | 364/424.1 |
| 4,718,307 * | 1/1988 | Yabe et al. | 74/866 |
| 4,784,007 | 11/1988 | Ishida et al. | 74/335 |
| 4,796,485 | 1/1989 | Ebina | 74/866 |
| 4,817,468 | 4/1989 | Leigh-Monstevens | 74/335 |
| 4,821,590 | 4/1989 | Tury et al. | 74/335 |
| 4,873,881 | 10/1989 | Edelen et al. | 74/336 |
| 5,035,113 * | 7/1991 | Simonyi et al. | 60/390 |
| 5,243,871 * | 9/1993 | Weiten | 74/473 R |
| 6,145,398 * | 11/2000 | Bansbach et al. | 74/335 |

* cited by examiner

Primary Examiner—Charles A Marmor
Assistant Examiner—Saúl Rodriguez
(74) Attorney, Agent, or Firm—Howard D. Gordon

(57) ABSTRACT

An X-Y shifter control (68) allows independent and simultaneous control of the X—X motor (32) and Y—Y motor (36). Required X—X movements of thie shift member (34) are initiated when the shift member is within a band (84) of the neutral (20) Y—Y position.

6 Claims, 6 Drawing Sheets

INDEPENDENT MOTOR CONTROL FOR X-Y SHIFTER

BACKGROUND OF THE INVENTION

1. Field of the Invention

The present invention relates to controls for X-Y shifters and, in particular, to controls for X-Y shifters utilizing independent and occasionally simultaneous control of the motors used to control the X—X and Y—Y shift positions.

2. Description of the Prior Art

Change-gear transmissions and so-called X-Y shifting devices therefor are well known in the prior art. Briefly, X-Y shifters are devices which control the X—X (or selection directional) and the Y—Y (or engage/not-engaged directional) position of a shift member, such as a shift finger or the like. Typically, two separate fluid or electric motors are used to control the X—X and Y—Y positions.

The X-Y shifters are mounted to the transmission and are manually controlled as "shift-by-wire" slave devices or are under the control of a system controller of a fully or partially automated transmission system.

X-Y shifters may be seen by reference to U.S. Pat. Nos. 4,621,328; 4,784,007; 4,796,485; 4,817,468; 4,821,590 and 4,873,590, the disclosures of which are incorporated herein by reference.

The current X-Y shifters use discreet, single-action controls which limit positioning of the shift member to only one axis at a time and require delays for coast-down, stopping and centering functions. This may result in shifts which are more time-consuming than desirable.

SUMMARY OF THE INVENTION

In accordance with the present invention, the drawbacks of the prior art are minimized or overcome by the provision of a control for an X-Y shifter which will allow quicker completion of shifts.

The foregoing is accomplished by providing independent controls for each of the X-Y shifter motors, which allows initiation of a required X—X movement as the Y—Y position comes within a given range of its target position and allows initiation of a required Y—Y movement as the X—X position is sensed as coming within a given range of its target position.

Accordingly, it is an object of the present invention to provide an improved X-Y shifter controller allowing quicker shift response.

This and other objects and advantages of the present invention will become apparent from a reading of the following description of the preferred embodiment taken in connection with the attached drawings.

DESCRIPTION OF THE PREFERRED EMBODIMENT

Figure 1:
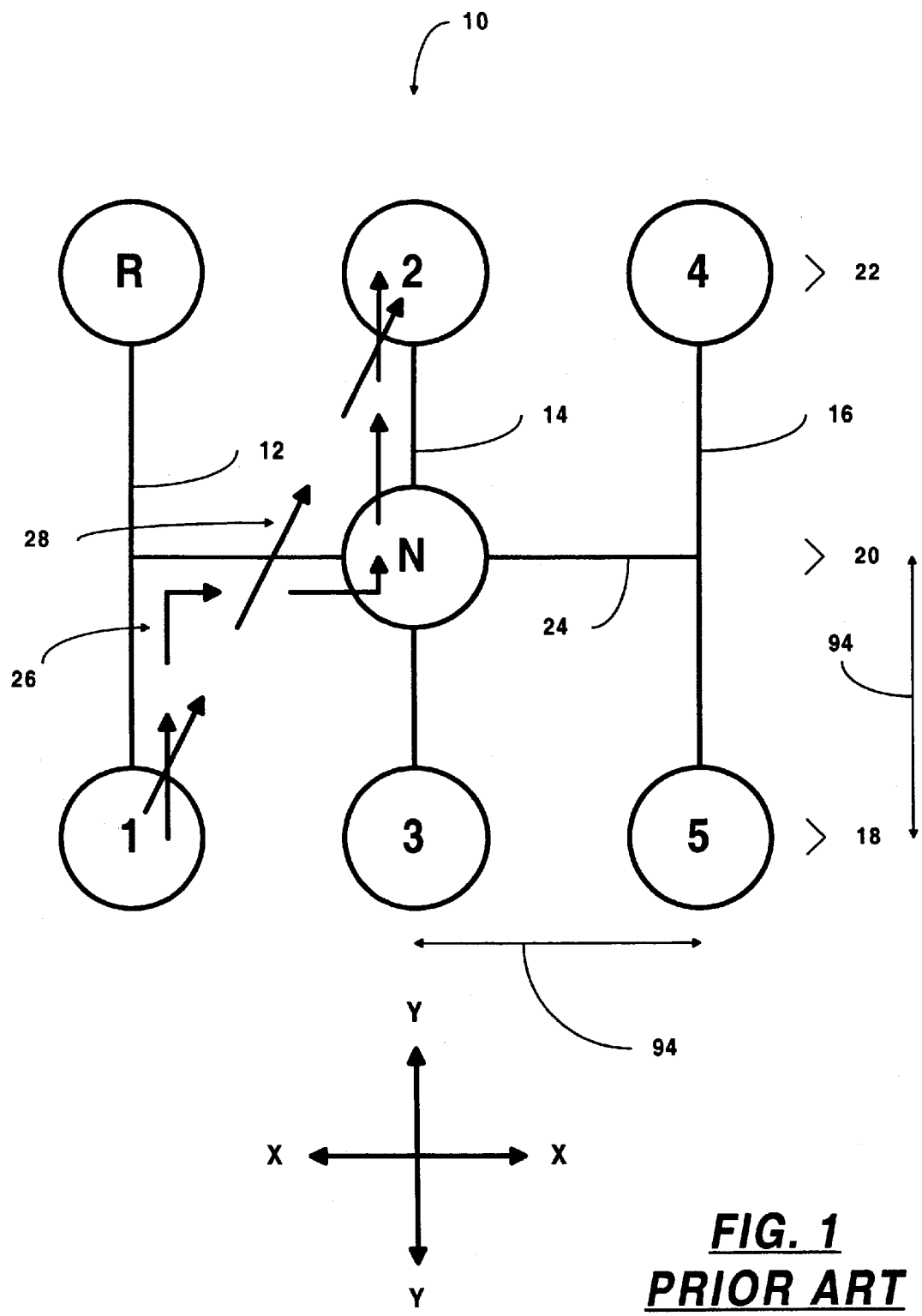
FIG. 1 is a schematic illustration of an H-type shift pattern for the shift member of an X-Y shifter.

FIG. 1 illustrates a typical, progressive, H-type shift pattern 10 for a one-reverse-speed, five-forward-speed transmission or main transmission section. In the case of compound transmissions (see, for example, U.S. Pat. Nos. 5,390,561 and 4,754,665), each of the main section positions could provide up to four selectable transmission ratios. The present invention is applicable to X-Y shifter controls for both simple transmissions and the main transmission sections of compound transmissions.

As is known, the purpose of an X-Y shifter is to properly position a shift member, such as shift finger, in one of the selected positions by moving along the indicated, generally perpendicular paths.

The shift member may be moved in the X—X direction to align with the R/1 leg 12, the 2/3 leg 14, or the 4/5 leg 16. The shift member may then be moved in the Y—Y direction to the 1/3/5 position 18, the N (neutral) position 20, or the R/2/4 position 22 to engage or disengage a particular ratio.

If a fully automatic transmission is involved, the shift pattern need not be progressive, as illustrated in FIG. 1.

By way of example, as is well known in the prior art, assuming the transmission is engaged in first gear ("1") and a shift to second gear ("2") is required (i.e., a "1–2" shift), the shift member must be moved in the Y—Y direction first along leg 12 from the 1/3/5 position 18 to the neutral ("N") position 20 to disengage first gear, then in the X—X direction along the neutral leg 24 to the 2/3 leg 14, and then in the Y—Y direction along the 2/3 leg 14 from the neutral position 20 to the R/2/4 position 22 to engage second gear. This path is indicated at line 26 in FIG. 1. The constraints of the shift bar housing assembly or shift shaft (see U.S. Pat. Nos. 5,893,293; 4,920,815; 5,743,143 and 4,584,895) usually will prevent a direct, straight-line path such as line 28 in FIG. 1.

Figure 2:
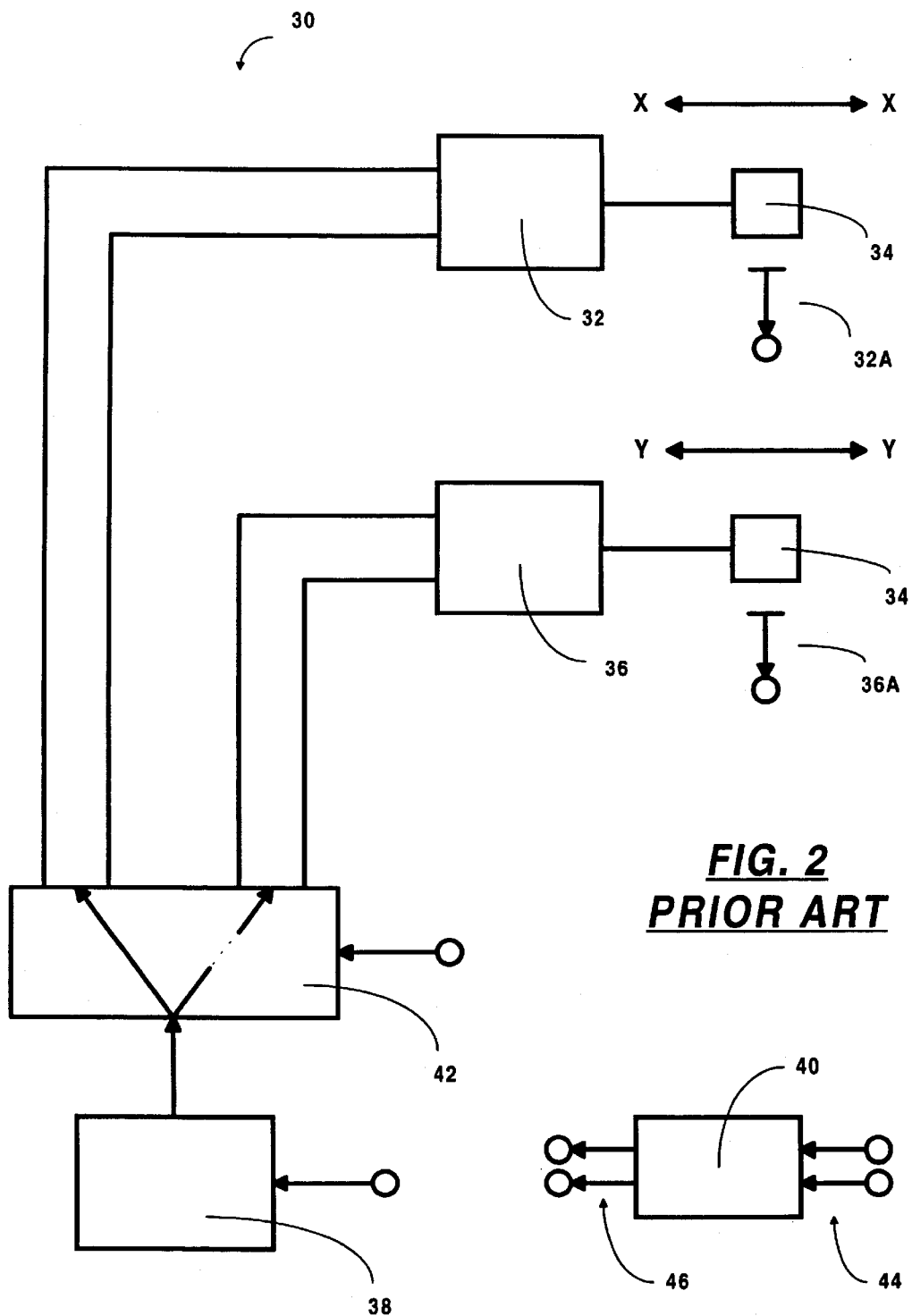
FIG. 2 is a schematic illustration of a typical prior art X-Y shifter control.
Figure 3:
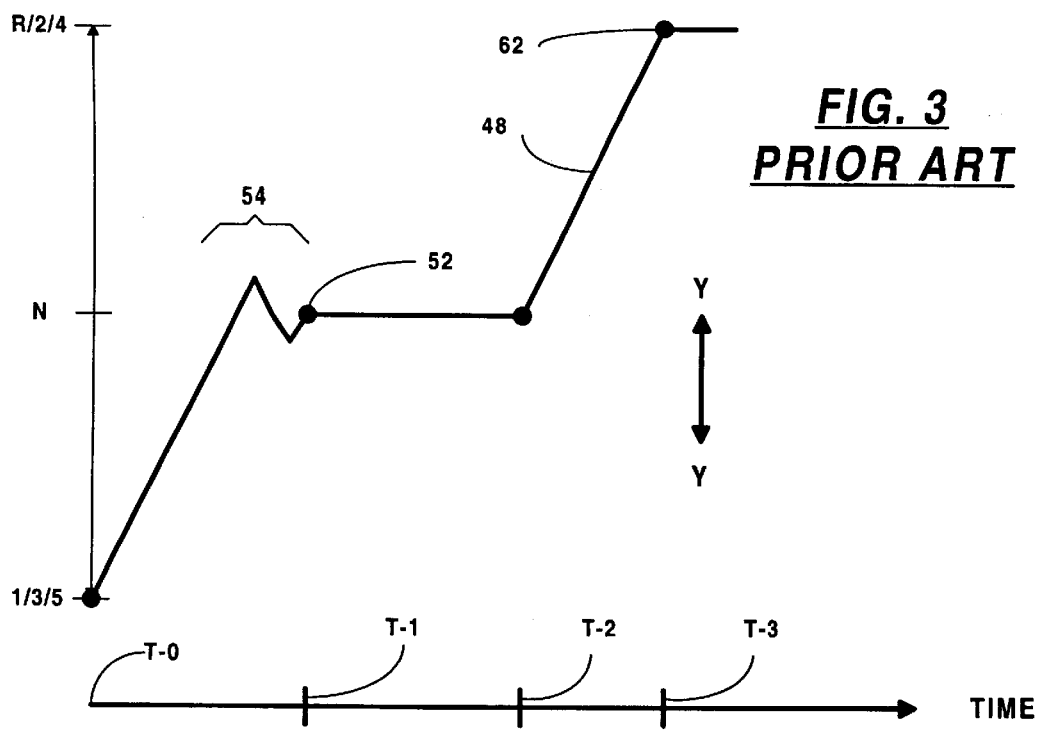
FIG. 3 is a schematic illustration of the X—X and Y—Y movements of the shifter of FIG. 2 in making a first-gear-position-to-second-gear-position shift.
Figure 3:
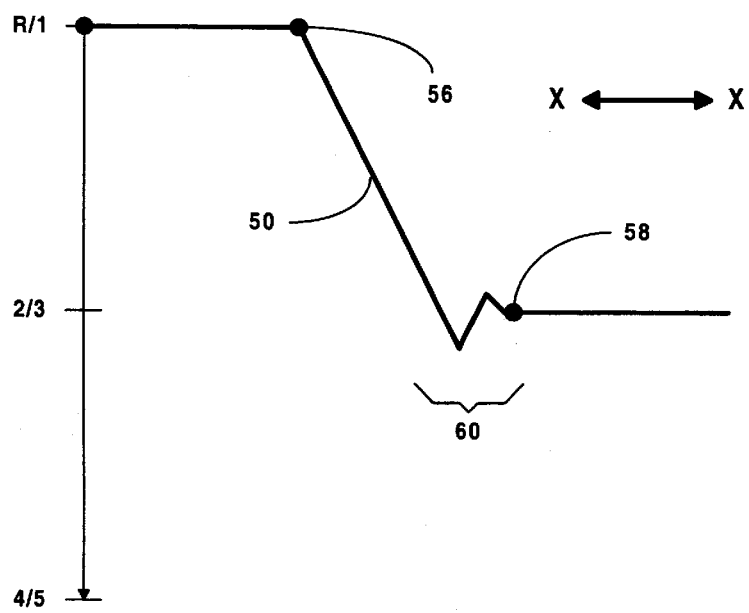

A typical prior art X-Y shifter control assembly 30 is shown in FIGS. 2 and 3. The control assembly includes a first motor 32 for moving the control member 34, such as a shift finger or the like, in the X—X direction and a second motor 36 for moving the control member 34 in the Y—Y direction. Motors 32 and 36 may be electric motors and/or fluid motors controlled by solenoids or the like. Sensors 32A and 36A may provide signals indicative of the X-Y position of shift member 34. A single driver 38 is controlled by ECU 40, which also controls a switching device 42 for connecting the driver one at a time to motors 32 and 36. ECU 40 is preferably microprocessor-based and receives input signals 44 and processes same according to logic rules to issue command output signals 46 (see U.S. Pat. Nos. 4,361,060 and 4,595,986, the disclosures of which are incorporated herein by reference).

With control assembly 30, motors 32 and 36 are controlled only one at a time, never simultaneously.

In FIG. 3, line 48 represents the Y—Y position and line 50 represents the X—X position of the shift member 34 at various times during a 1–2 shift (along line 26) using the control assembly 30 of FIG. 2.

At time zero, the first gear ("1") is engaged, and member 34 is in the 1/3/5 Y—Y position 18 and the R/1 X—X position. The Y—Y motor 38 is controlled to move the shift member 34 to the neutral Y—Y position 20, and 34 will settle into that position 52 at time $T_1$. It is noted that a period of time 54 is required for the shift member to settle into a centered, neutral position. At time $T_1$, the switch is commanded to cause X—X motor 32 to be controlled and shift member 34 will be moved from its initial R/1 X—X position 56 to the 2/3 X—X position 58 at time $T_2$. It is noted that a period of time 60 is required for the shift member to settle into the 2/3 X—X position. At time $T_2$, the switch 42 is commanded to cause Y—Y motor 36 to be controlled and shift member 34 will be moved to the R/2/4 Y—Y position 62 to complete the 1–2 shift at time $T_3$. Thus, a 1–2 shift using the prior art X-Y shift controls took a period of time equal to at least $T_3$.

Figure 4:
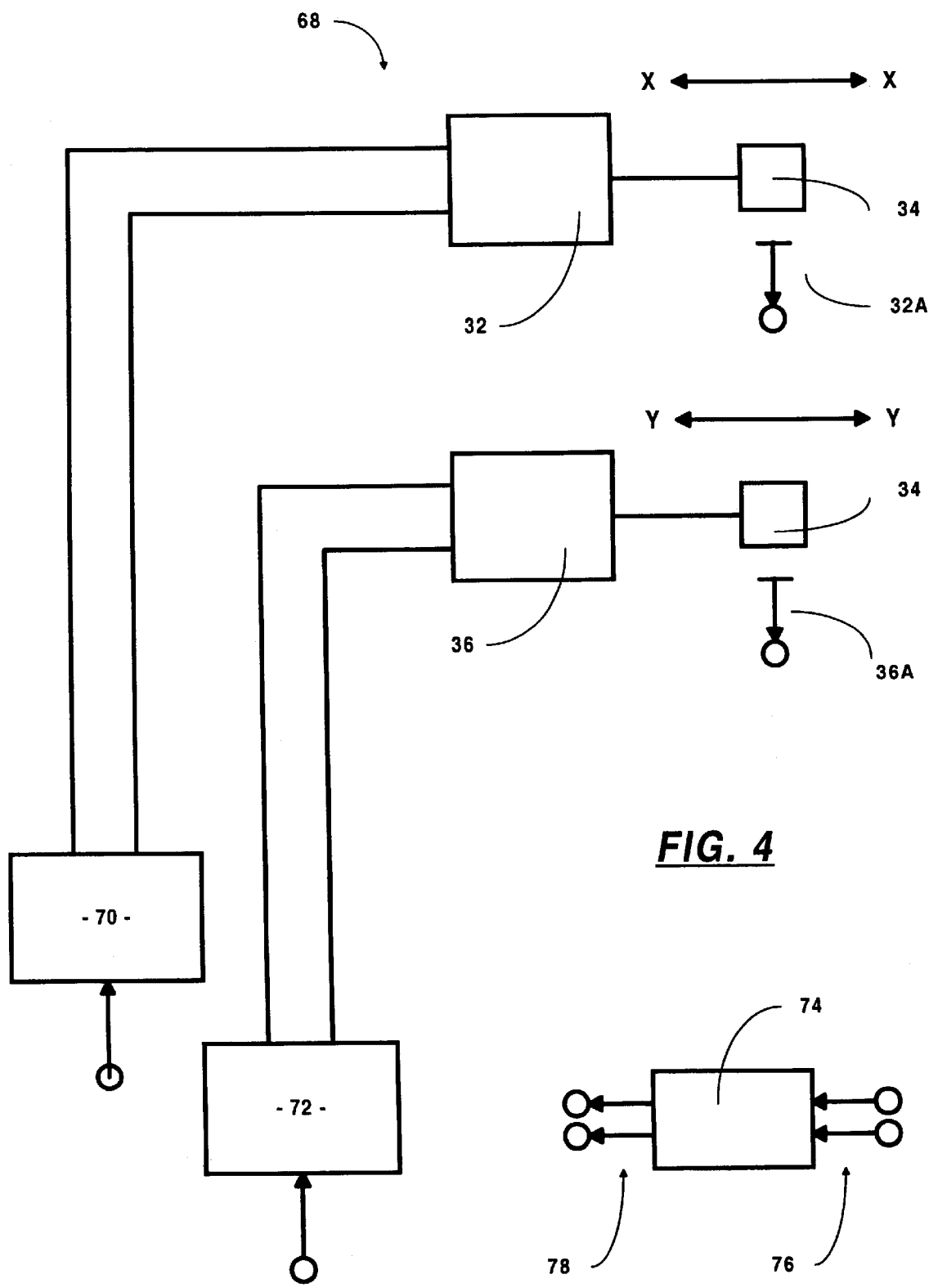
FIG. 4 is a schematic illustration of, similar to FIG. 2, of the X-Y shifter control of the present invention.
Figure 5:
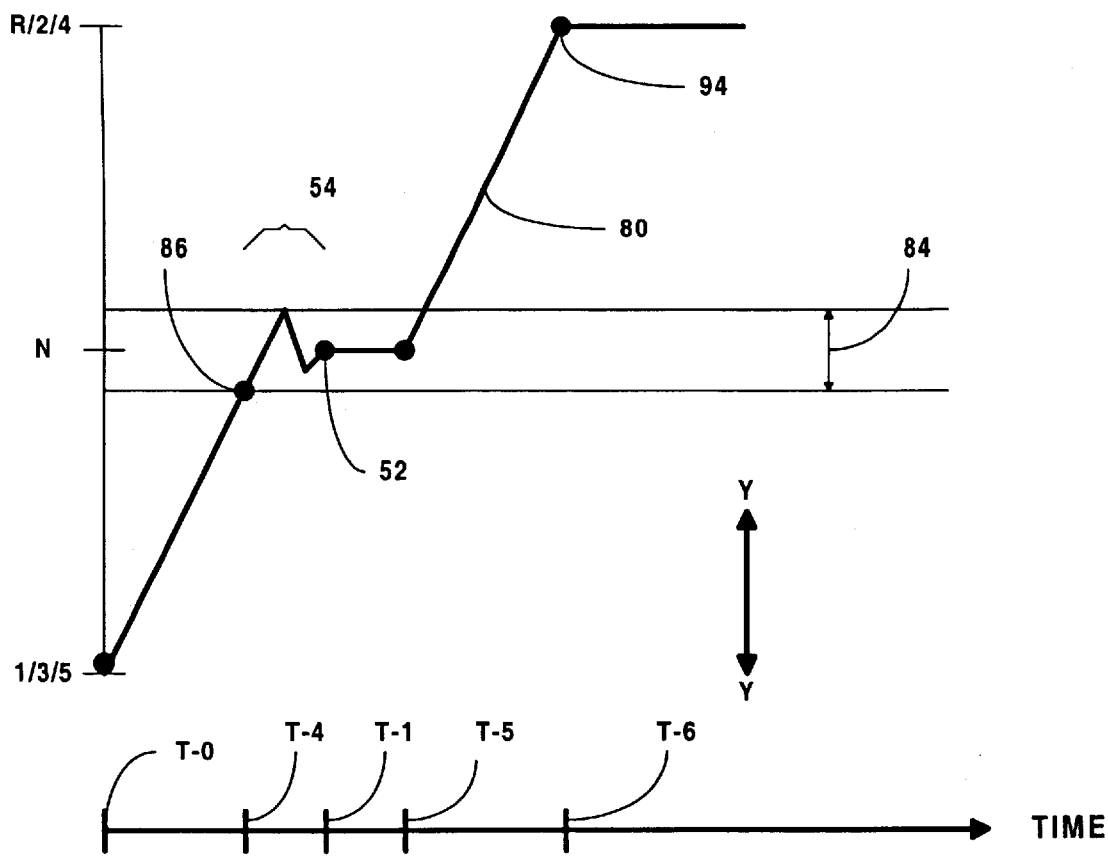
FIG. 5 is a schematic illustration, similar to FIG. 3, of the X—X and Y—Y movements of the shifter of FIG. 4.
Figure 5:
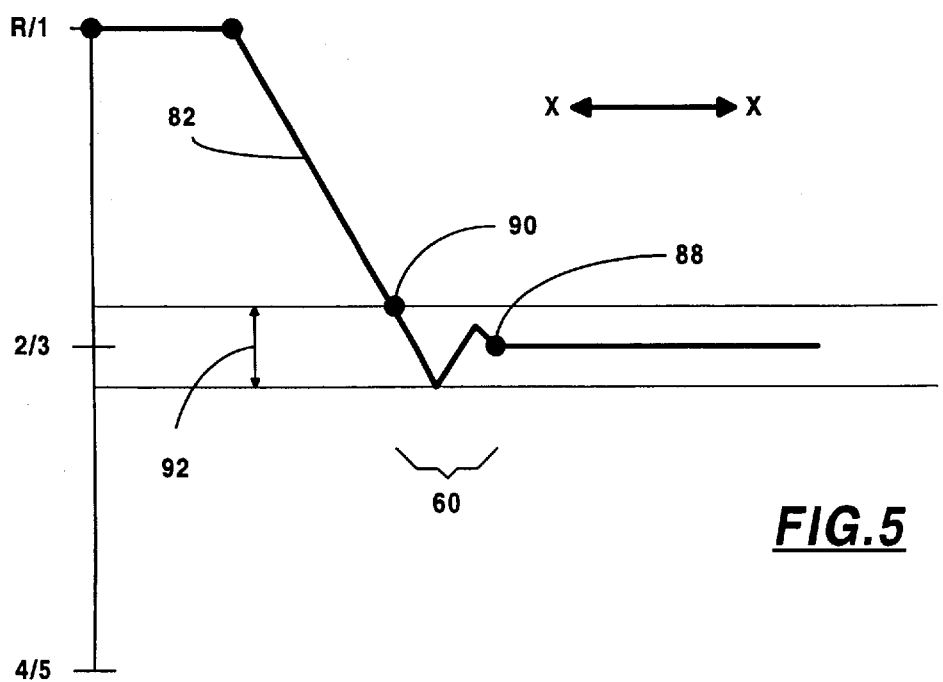

FIGS. 4 and 5 schematically illustrate the X-Y shifter control of the present invention. Elements of FIGS. 4 and 5 which are structurally and functionally identical or substantially identical to elements of the prior art control illustrated in FIGS. 2 and 3 will be assigned like reference numerals.

Control assembly 68 of the present invention also includes X—X control motor 32, Y—Y control motor 36, shift control member 34 and position sensors 32A and 36A. Control assembly 68 differs from the prior art in that two independent drivers 70 and 72 are provided for controlling the motors 32 and 36, respectively. An ECU 74 receives input signals 76 and processes same according to logic rules to issue command output signals 78. Using two separate drivers 70 and 72 allows for independent and simultaneous control of the positioning motors 32 and 36.

In FIG. 5, which is the same type of graphical representation as FIG. 3, line 80 represents the Y—Y position and line 82 represents the X—X position of the shift member 34 at various times during a 1–2 shift (also along line 26) using the control assembly of FIG. 4.

At time zero, $T_0$, first gear is engaged and member 34 is in the 1/3/5 Y—Y position and the R/1 X—X position. The Y—Y motor is controlled to move the shift member 34 to the neutral Y—Y position 20 and will settle into the centered position 52 at time $T_1$ after a period 54 of settling. However, as the control member comes within a band 84 of the neutral Y—Y position, at position 86 (which occurs at a time $T_4$), the X—X motor 32, independently of motor 36, is caused to initiate movement of the control member to the 2/3 X—X position. In effect, the X—X motor 32 is controlling X—X movement of the control member simultaneously with the Y—Y motor 36 centering the shift member 34 in the neutral Y—Y position.

As the X—X motor 32 causes the shift member 34 to be centered at position 88 in the 2/3 X—X position, it will, at position 90, come within a band 92 (which may be equal to band 84) of the 2/3 X—X position at position 88. At time $T_5$, when the X-Y position 90 is reached, the Y—Y motor will initiate movement of the shift member 34 toward the R/2/4 Y—Y position, and upon reaching position 94 at time $T_6$, the 1–2 shift will be complete.

Given equally responsive actuators, the time period $T_0$ to $T_6$ in FIG. 5 will be considerably shorter than the time period $T_0$ to $T_3$ in FIG. 3.

By initiating controlled movement in the X—X direction as the Y—Y position of shift member 34 enters a band around the Y—Y target, the time required to complete a shift may be shortened by a time equal to the time required for the shift member to settle centered in the target Y—Y position, i.e., by the time period 54. A similar time savings may be realized by initiating Y—Y movement as the shift member centers about a target X—X position.

The bands 84 and 92 will be selected in view of the characteristics of the shift shaft or shift bar mechanism controlled by the shift member 34, the responsiveness of the system, and other variables. It is believed that bands of about ±5% to ±10% of the separation between the legs 12, 14 and 16 or between positions 18 and 20 or 20 and 22 will provide satisfactory performance.

The control logic for control assembly 68 may be summarized as follows:

(a) if disengaging and within ±10% of neutral position 20, then initiate a rail change (X—X movement) if required; and (b) if engaging and within ±10% of a target rail position (12, 14 or 16), then initiate an in-gear movement (Y—Y movement) if required.

Figure 6A:
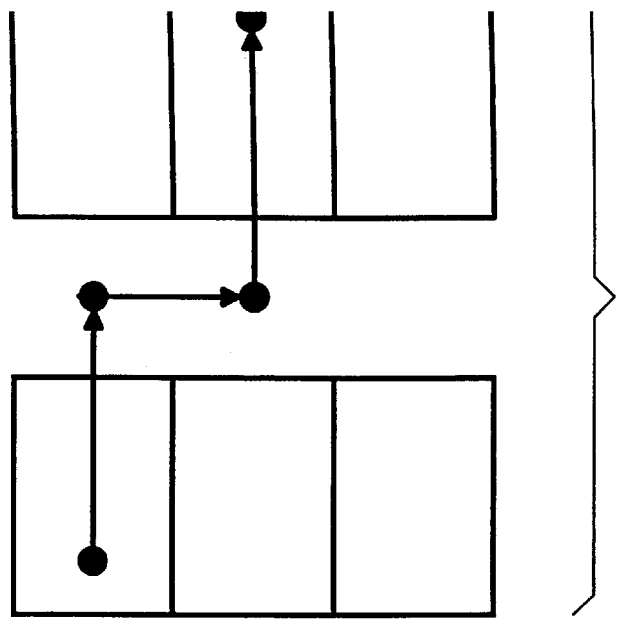
FIGS. 6A and 6B illustrate an alternate embodiment of the present invention.
Figure 6B:
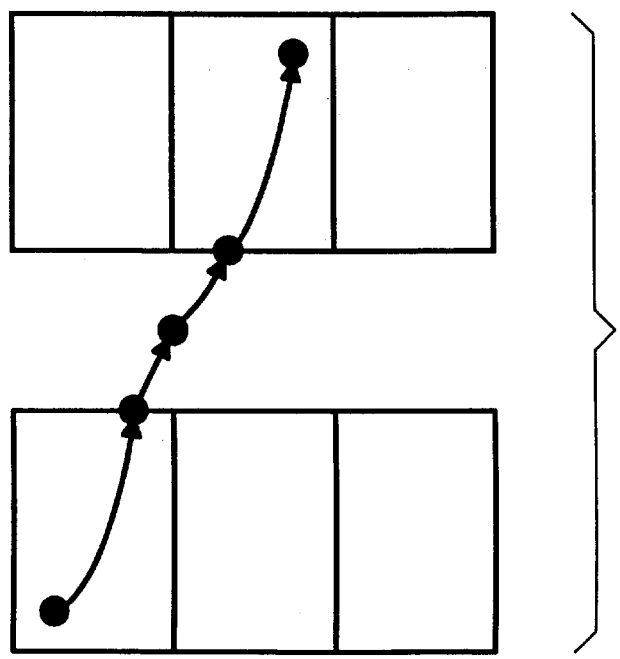

An alternate advantage of the present invention is illustrated in FIGS. 6A and 6B. FIG. 6A illustrates the typical movement of a shift finger in a 1–2 shift. If the tolerances are properly provided, a shift finger movement such as that illustrated in FIG. 6B may be utilized. The movement illustrated in FIG. 6B avoids the complete stops in the X—X and/or the Y—Y direction and the losses of energy associated therewith.

Accordingly, it may be seen that a new and improved X-Y shifter control is provided.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. A control for an X-Y shifter having a first motor (32) controlling X—X movement of a shift member (34) and a second motor (36) controlling Y—Y movement of said shift member, a first motor controller for controlling operation of said first motor, a second motor controller for controlling operation of said second motor, said first and second motor controllers allowing independent and simultaneous control of said first and second motors, sensors for sensing a position of said shift member, a system controller for receiving input signals, including signals indicative of the position of said shift member, and processing same according to logic rules to issue command output signals, including signals to said first and second motor controllers.

2. The control of claim 1 wherein said logic rules include rules for causing simultaneous operation of said first and second motors.

3. The control of claim 2 wherein said shift member (34) is moved along an H-type shift pattern including a neutral Y—Y position and said logic rules include rules for initiating a required X—X movement of said shift member when the sensed Y—Y position of said shift member is within a predetermined band (84) of said neutral Y—Y position.

4. The control of claim 3 wherein said shift pattern includes at least one engaged Y—Y position, said band is equal to about 5% to 10% of the separation (94) between said engaged and said neutral Y—Y positions.

5. The control of claim 2 wherein said shift member (34) is moved along an H-type shift pattern, including two or more selection X—X positions (12, 14, 16) and said logic rules include rules for initiating a required Y—Y movement of said shift member when the sensed X—X position of said shift member is within a predetermined band (92) of a selection X—X position.

6. The control of claim 5 wherein said band is equal to about 5% to 10% of the separation (94) between said selection X—X positions.

* * * * *